US008738713B2

(12) United States Patent
Kim

(10) Patent No.: US 8,738,713 B2
(45) Date of Patent: May 27, 2014

(54) MOBILE TERMINAL AND METHOD OF CONTROLLING OPERATION OF THE MOBILE TERMINAL

(75) Inventor: Taeyong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 293 days.

(21) Appl. No.: 13/080,417

(22) Filed: Apr. 5, 2011

(65) Prior Publication Data

US 2011/0252102 A1 Oct. 13, 2011

(30) Foreign Application Priority Data

Apr. 9, 2010 (KR) ........................ 10-2010-0032891

(51) Int. Cl.
*G06F 15/16* (2006.01)
(52) U.S. Cl.
USPC ............................ 709/206; 709/201; 709/246
(58) Field of Classification Search
None
See application file for complete search history.

(56) References Cited

U.S. PATENT DOCUMENTS

| 5,647,002 | A | 7/1997 | Brunson ........................ 709/206 |
| 7,587,678 | B1 | 9/2009 | English et al. ................ 715/752 |
| 8,126,976 | B2 | 2/2012 | Klassen et al. ................ 709/206 |
| 8,185,591 | B1 | 5/2012 | Lewis ........................... 709/206 |
| 2007/0250583 | A1 | 10/2007 | Hardy et al. .................. 709/206 |
| 2007/0255792 | A1 | 11/2007 | Gronberg ...................... 709/206 |
| 2008/0046807 | A1 | 2/2008 | Margitich et al. ............. 715/222 |
| 2010/0011075 | A1 | 1/2010 | Klassen et al. ................ 709/206 |
| 2010/0011077 | A1 | 1/2010 | Shkolnikov et al. .......... 709/206 |
| 2010/0095224 | A1 | 4/2010 | Yozell-Epstein et al. ..... 715/752 |
| 2010/0325155 | A1 | 12/2010 | Skinner et al. ................ 707/770 |
| 2011/0060910 | A1 | 3/2011 | Gormish et al. ............. 713/176 |
| 2011/0162027 | A1 | 6/2011 | Chen et al. .................... 725/117 |

*Primary Examiner* — Kibrom T Hailu
(74) *Attorney, Agent, or Firm* — Birch, Stewart, Kolasch & Birch, LLP

(57) ABSTRACT

A mobile terminal and a method of controlling the operation of the mobile terminal are provided. The method includes downloading, via a wireless communication unit, an email into a temporary storage from a mail server, wherein the email includes a header, a content, and a first file, converting, via a controller, the first file corresponding to a file attachment in the email into a second file to fit a size of a display area, storing the email and the second file in a memory, withdrawing, from the memory, the content of the email and displaying, on the display area, the content, if a first request to display the content is received, and withdrawing, from the memory, the second file and displaying the second file on the display area, if a second request to display the first file is received.

15 Claims, 7 Drawing Sheets

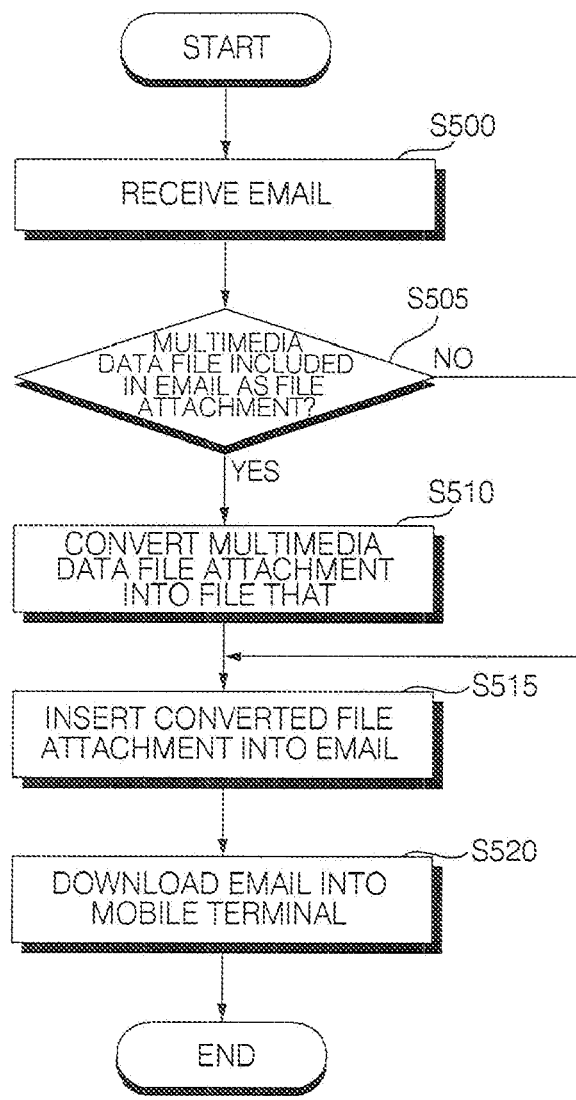

MOBILE TERMINAL AND METHOD OF CONTROLLING OPERATION OF THE MOBILE TERMINAL

CROSS-REFERENCE TO RELATED APPLICATION

This application claims the priority benefit of Korean Patent Application No. 10-2010-0032891, filed on Apr. 9, 2010 in the Korean Intellectual Property Office, the disclosure of which is incorporated herein by reference.

BACKGROUND OF THE INVENTION

1. Field of the Invention

The present invention relates to a mobile terminal and a method of controlling the operation of the mobile terminal, and more particularly, to a mobile terminal and a method of controlling the operation of the mobile terminal, in which the power consumption of the mobile terminal on email processing can be effectively reduced.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless interne services and have thus evolved into multimedia players.

In the meantime, people nowadays can surf on the interne, chat with friends or coworkers, or send or receive emails using their mobile terminals.

Typically, in order to check emails with mobile terminals, users are required to undergo a number of processes such as downloading emails from a mail server, storing the downloaded emails in, for example, a secure digital (SD) memory, reading out the emails from the SD memory upon the request of a user, and rendering a file attachment, if any, in each of the read-out email need to be performed.

However, accessing an SD memory of a mobile terminal and rendering a file attachment, if any, in each email present in the SD memory whenever necessary may increase too much the power consumption of the mobile terminal especially when the file attachment is a large-size file.

Therefore, a method is needed to make efficient use of the resources of a mobile terminal and thus to reduce the power consumption of the mobile terminal on email processing.

SUMMARY OF THE INVENTION

The present invention provides a mobile terminal and a method of controlling the operation of the mobile terminal, in which the power consumption of the mobile terminal on email processing can be effectively reduced by making efficient use of the resources of the mobile terminal.

According to an aspect of the present invention, there is provided a method of controlling the operation of a mobile terminal, the method including downloading an email into a temporary storage from a mail server and converting a first file, which is a file attachment in the email, into a second file that fits the size of a display area; storing the email and the second file in a memory; and if a request for a viewing of the first file is received, withdrawing the second file from the memory and displaying the second file.

According to another aspect of the present invention, there is provided a mobile terminal including a wireless communication unit configured to download an email from a mail server; a display module configured to display the content of the email and a file attachment in the email thereon; a memory; and a controller configured to convert the file attachment into a file that fits the size of a display area on the display module and store the email and the file in the memory, wherein, if a request for a viewing of the file attachment is received, the controller withdraws the file from the memory and displays the file on the display module.

According to another aspect of the present invention, there is provided a method of providing an email service to a mobile terminal, the method including receiving an email including a mail body and a file attachment having a first format; converting the file attachment into a file having a second format that can be readily displayed without a requirement of decoding; and inserting the file into the email and downloading the email into the mobile terminal.

According to another aspect of the present invention, there is provided a method of downloading, via a wireless communication unit, an email into a temporary storage from a mail server, wherein the email includes a header, a content, and a first file, converting, via a controller, the first file corresponding to a file attachment in the email into a second file to fit a size of a display area, storing the email and the second file in a memory, withdrawing, from the memory, the content of the email and displaying, on the display area, the content, if a first request to display the content is received, and withdrawing, from the memory, the second file and displaying the second file on the display area, if a second request to display the first file is received.

According to another aspect of the present invention, there is provided a mobile terminal including a wireless communication unit configured to download an email from a mail server, wherein the email includes a header, a content and a file attachment, a display module configured to display the content and the file attachment in the email, a memory, and a controller configured to convert the file attachment into a file that fits a size of a display area on the display module, to store the email and the converted file in the memory, to withdraw the content from the memory and display the content on the display module, if a first request to display the content is received, and to withdraw the file from the memory and display the converted file on the display module, if a second request to view the file attachment is received.

According to another aspect of the present invention, there is provided a method of receiving, from an email server, a first email including a header, a mail body, and a file attachment having a first format, converting the file attachment having the first format into a file having a predetermined second format to be readily displayed on a display module of the mobile terminal without further decoding the file attachment upon receiving a request to display the file attachment, creating a second email by inserting the file having the second format, and downloading the second email into the mobile terminal, wherein the second email includes the same header and mail body as the first email.

BRIEF DESCRIPTION OF THE DRAWINGS

The above and other features and advantages of the present invention will become more apparent by describing in detail preferred embodiments thereof with reference to the attached drawings in which:

FIG. 7 is a flowchart illustrating a method of converting the format of a file attachment in an email.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), a navigation device, a tablet computer, or an electronic book (e-book) reader. In this disclosure, the terms 'module' and 'unit' can be used interchangeably.

Figure 1:
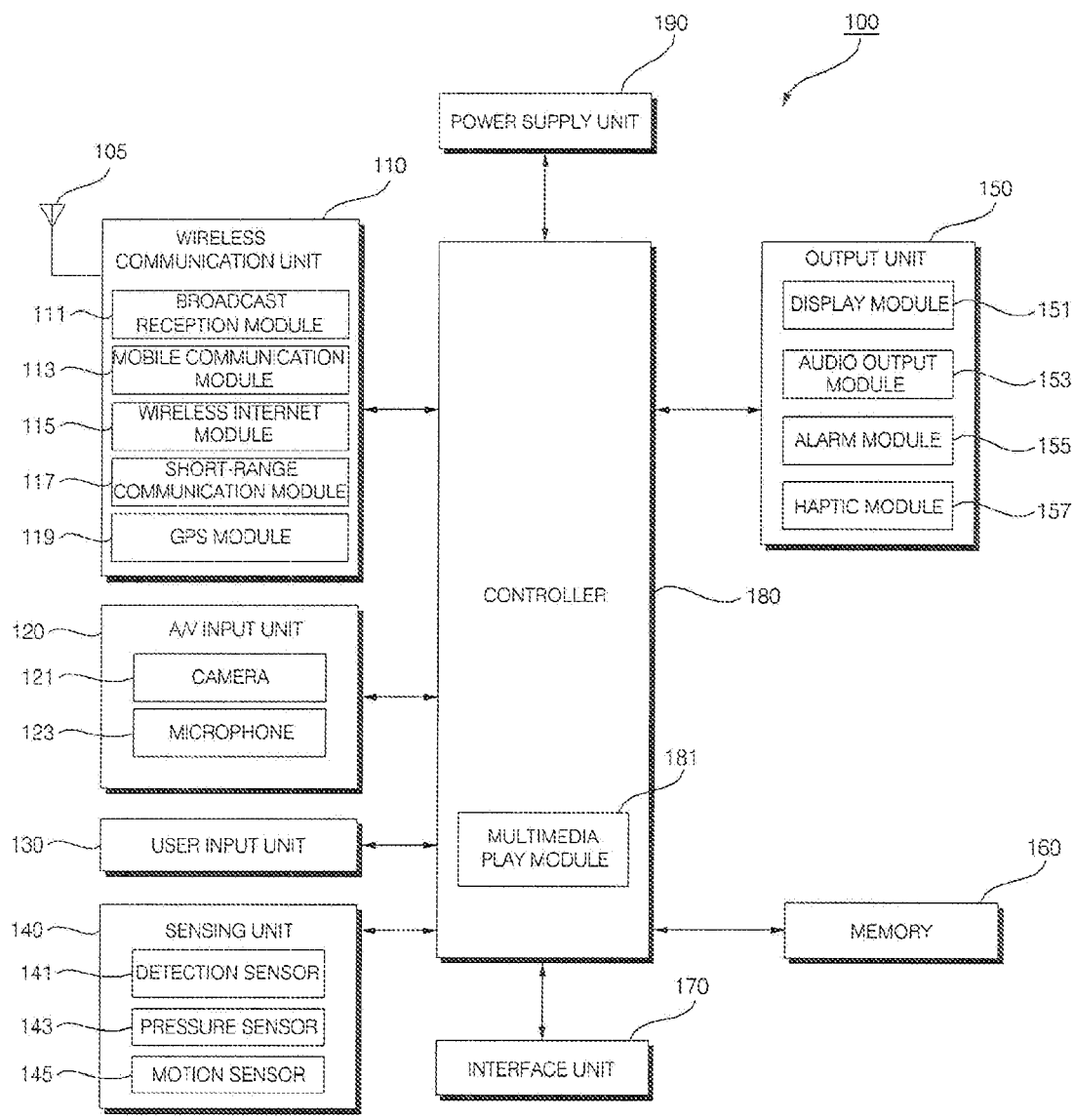
FIG. 1 is a block diagram of a mobile terminal according to an exemplary embodiment of the present invention.

FIG. 1 is a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, or a static pressure or capacitive touch pad which is capable of receiving a command or information by being pushed or touched by a user. Alternatively, the user input unit 130 may be implemented as a wheel, a jog dial or wheel, or a joystick capable of receiving a command or information by being rotated. Still alternatively, the user input unit 130 may be implemented as a finger mouse. In particular, if the user input unit 130 is implemented as a touch pad and forms a mutual layer structure with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user; and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a detection sensor 141, a pressure sensor 143 and a motion sensor 145. The detection sensor 141 may determine whether there is an object nearby and approaching the mobile terminal 100 without any mechanical contact with the entity. More specifically, the detection sensor 141 may detect an object that is nearby and approaching by detecting a change in an alternating magnetic field or the rate of change of static capacitance. The sensing unit 140 may include two or more detection sensors 141.

The pressure sensor 143 may determine whether pressure is being applied to the mobile terminal 100 or may measure the level of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated using a higher pressure level than that used to generate a typical touch input, based on data provided by the pressure sensor 143. In addition, when a pressure touch input is received through the display module 151, it is possible to determine the level of pressure applied to the display module 151 upon the detection of a pressure touch input based on data provided by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior structure of the mobile terminal 100 will hereinafter be described in detail with reference to FIGS. 2 and 3. The present invention can be applied to nearly all types of mobile terminals such as a folder-type, a bar-type, a swing-type and a slider-type mobile terminal. However, for convenience, it is assumed that the mobile terminal 100 is a bar-type mobile terminal equipped with a full touch screen.

Figure 2:
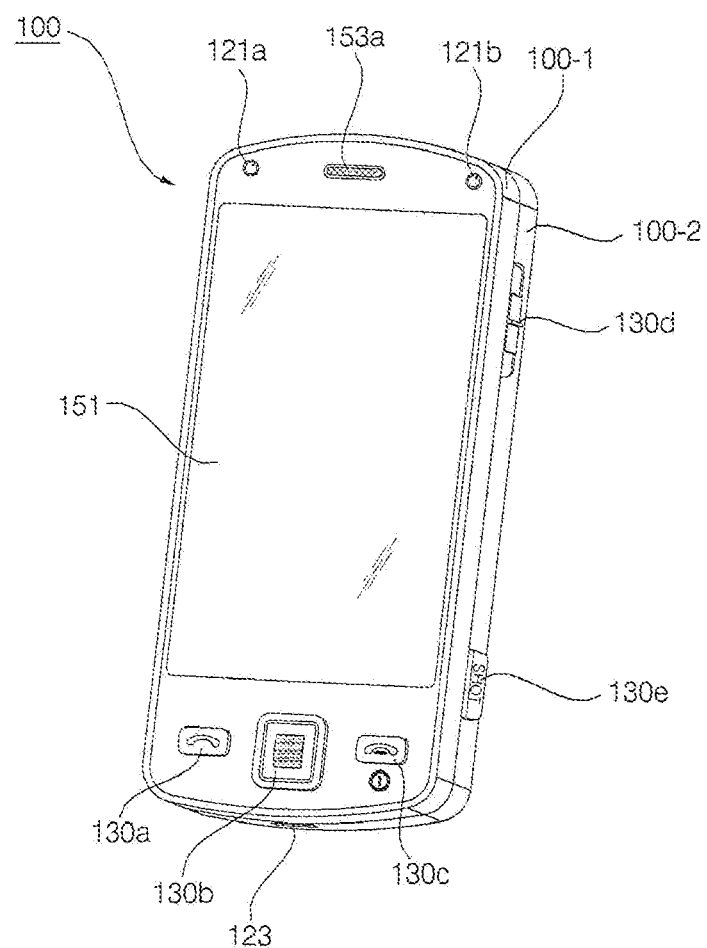
FIG. 2 is a front perspective view of the mobile terminal shown in FIG. 1.
Figure 3:
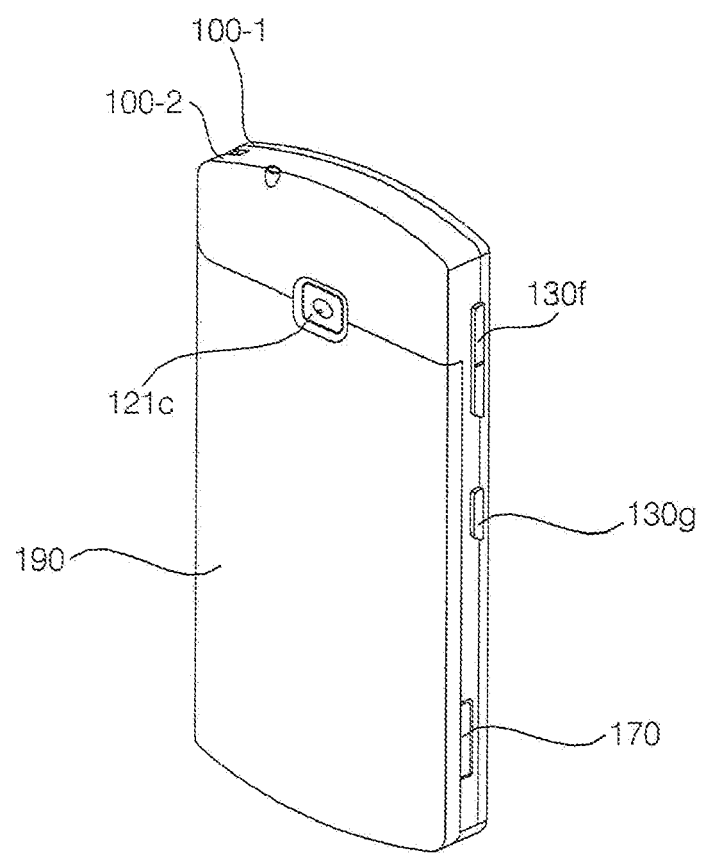
FIG. 3 is a rear perspective view of the mobile terminal shown in FIG. 2.

FIG. 2 is a front perspective view of the mobile terminal 100, and FIG. 3 is a rear perspective view of the mobile terminal 100. Referring to FIG. 2, the exterior of the mobile terminal 100 may be formed by a front case 100-1 and a rear case 100-2. Various electronic devices may be installed in the space formed by the front case 100-1 and the rear case 100-2. The front case 100-1 and the rear case 100-2 may be formed of a synthetic resin through injection molding. Alternatively, the front case 100-1 and the rear case 100-2 may be formed of a metal such as stainless steel (STS) or titanium (Ti).

The display module 151, a first audio output module 153*a*, a first camera 121*a*, and first through third user input modules 130*a* through 130*c* may be disposed in the main body of the mobile terminal 100, and particularly, on the front case 100-1. Fourth and fifth user input modules 130*d* and 130*e* and the microphone 123 may be disposed on one side of the rear case 100-2.

If a touch pad is configured to overlap the display module 151 and thus to form a mutual layer structure, the display module 151 may serve as a touch screen. Thus, the user can enter various information to the mobile terminal 100 simply by touching the display module 151.

The first audio output module 153*a* may be implemented as a receiver or a speaker. The first camera 121*a* may be configured to be suitable for capturing a still or moving image of the user. The microphone 123 may be configured to properly receive the user's voice or other sounds.

The first through fifth user input modules 130*a* through 130*c* and sixth and seventh user input modules 130*f* and 130*g* may be collectively referred to as the user input unit 130, and any means can be employed as the first through seventh user input modules 130*a* through 130*f* so long as it can operate in a tactile manner. For example, the user input unit 130 may be implemented as a dome switch or a touch pad that can receive a command or information according to a pressing or a touch operation by the user, or may be implemented as a wheel or jog type for rotating a key or as a joystick. In terms of function, the first through third user input modules 130*a* through 130*c* may operate as function keys for making or receiving a call, moving a mouse pointer, scrolling a display screen and entering a command such as start, end, or scroll, the fourth user input module 130d may operate as a function key for selecting an operating mode for the mobile terminal 100, and the fifth user input module 130e may operate as a hot key for activating a special function within the mobile terminal 100.

Referring to FIG. 3, a second camera 121b may be additionally provided at the rear of the rear case 100-2, and the sixth and seventh user input modules 130f and 130g and the interface unit 170 may be disposed on one side of the rear case 100-2.

The second camera 121b may have an image capture direction which is substantially the opposite to that of the first camera 121a, and may have a different resolution from that of the first camera 121a.

A flash and a mirror may be disposed to be adjacent to the second camera 121b. When an image of a subject is captured with the second camera 121b, the flash may illuminate the subject. The mirror may allow the user to see him- or herself when he or she wants to capture his or her own image by using the second camera 121b.

Another audio output module (not shown) may be additionally provided on the rear case 100-2. The audio output module on the rear case 100-2 may realize a stereo function along with the audio output module 153 on the front case 100-1. The audio output module on the rear case 100-2 may also be used in a speaker-phone mode.

The interface unit 170 may used as a passage allowing the mobile terminal 100 to exchange data with an external device either through a fixed line or wirelessly.

A broadcast signal reception antenna may be disposed at one side of the front or rear case 100-1 or 100-2, in addition to an antenna used for call communication. The broadcast signal reception antenna may be installed such that it can be extended from the front or rear case 100-1 or 100-2.

The power supply unit 190 may be mounted on the rear case 100-2 and may supply power to the mobile terminal 100. The power supply unit 190 may be, for example, a chargeable battery which can be detachably combined to the rear case 100-2 for being charged.

The second camera 121b and the other elements that have been described as being provided on the rear case 100-2 may be provided on the front case 100-1. In addition, the first camera 121a may be configured to be rotatable and thus to allow image capturing in various directions. In this case, the second camera 121b may be optional.

Figure 4:
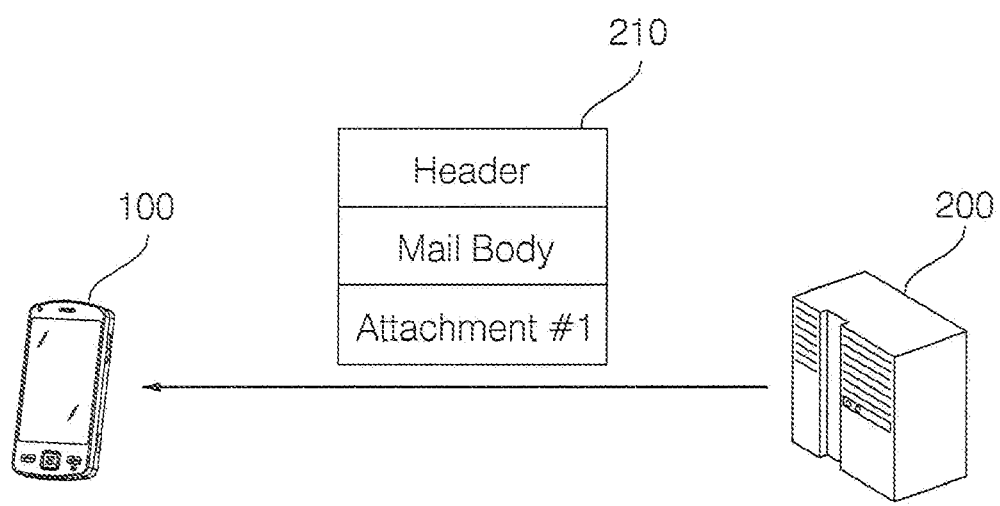
FIG. 4 is a diagram illustrating an example of how the mobile terminal shown in FIG. 1 can download emails.

FIG. 4 is a diagram illustrating how the mobile terminal 100 can download emails. Referring to FIG. 4, the mobile terminal 100 may download an email 210 from a mail server 200. The email 210 may include a header having information on the email 210 and a mail body having the content of the email 210. The email 210 may also include one or more file attachments.

The email 210 may be downloaded using different methods according to the type of protocol used. For example, if the email 210 uses Post Office Protocol 3 (POPS), the mail server 200 may download the whole email 210 into the mobile terminal 100. In this case, if the email 210 has more than one file attachment, the content of each of the file attachments can be displayed only when all the file attachments are downloaded into the mobile terminal 100.

On the other hand, if the email 210 uses Internet Message Access Protocol (IMAP), the mail server 200 may download the email 210 into the mobile terminal 100 in units of file attachments, if any, in the email 210. Thus, the contents of the file attachments in the email 210 may be selectively downloaded into and displayed on the mobile terminal 100.

Figure 5:
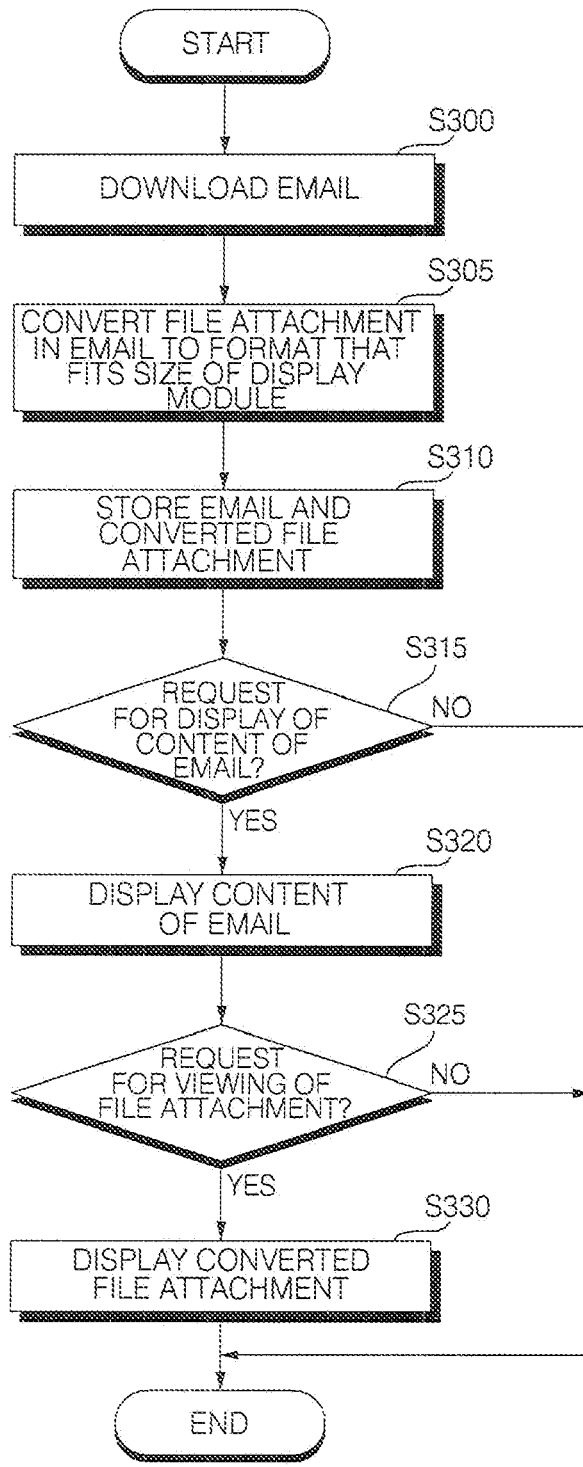
FIG. 5 is a flowchart illustrating a method of controlling the operation of a mobile terminal, according to an exemplary embodiment of the present invention.

FIG. 5 is a flowchart illustrating a method of controlling the operation of a mobile terminal, according to an exemplary embodiment of the present invention. Referring to FIG. 5, the controller 180 downloads an email from the mail server 200 via the wireless communication unit 110 (S300). The controller 180 may store the email in the temporary storage thereof.

As soon as the download of the email begins, the controller 180 executes a file viewer and thus converts a file attachment, if any, in the email to a format that can fit the size of a display area on the display module 151 (S305). The controller 180 may perform the download of the email, the execution of the file viewer and the conversion of the file attachment in the email at the same time in a time-sharing manner.

More specifically, the execution of the file viewer and the conversion of the file attachment in the email may be readily performed upon the commencement of the download of the email in order to reduce idle time of the controller 180 and thus to reduce the power consumption of the mobile terminal 100.

In addition, in consideration that operations associated with an external I/O device such as an SD memory generally consume too much battery power, the controller 180 may temporarily store the email in the temporary storage and may convert the format of the file attachment in the email while the email is being stored in the temporary storage, and may thus reduce the power consumption of the mobile terminal 100, compared to the case of converting the format of a file attachment in an email while the email is being stored in an SD memory.

The size of the file attachment in the email may be reduced through file conversion. For example, if the file attachment in the email has a size of about 1.5 Mbytes, which is equivalent to the size of a PowerPoint file having 10 slides, it may be converted into a file having a size of 200 Kbytes. Therefore, it is more preferable, in terms of power consumption, to convert a file attachment into a smaller-size file and then store the smaller-size file in the memory 160 than to store the file attachment as it is in the memory 160.

Once the conversion of the file attachment in the email is complete, the controller 180 stores the email and the converted file attachment in the memory 160 (S310). The controller 180 may also store the original file attachment in the email in the memory 160. The memory 160 may include an SD memory.

Thereafter, if the content of the downloaded email is chosen to be displayed in response to, for example, a user command (S315), the controller 180 withdraws data corresponding to the content of the downloaded email from the memory 160 and then displays the withdrawn data on the display module 151 (S320).

Thereafter, if a request for a viewing of the file attachment in the email is received (S325), the controller 180 withdraws the converted file attachment from the memory 160 and then displays the withdrawn file attachment on the display module 151 (S330). Since the withdrawn file attachment is a file obtained by converting the original file attachment in the email to a format that fits the size of the display area on the display module 151, the withdrawn file can be readily displayed on the display module 151 without a requirement of, for example, rendering.

According to this exemplary embodiment, it is possible to reduce the power consumption of the mobile terminal 100 on email processing by making efficient use of the resources of the mobile terminal 100.

Figure 6:
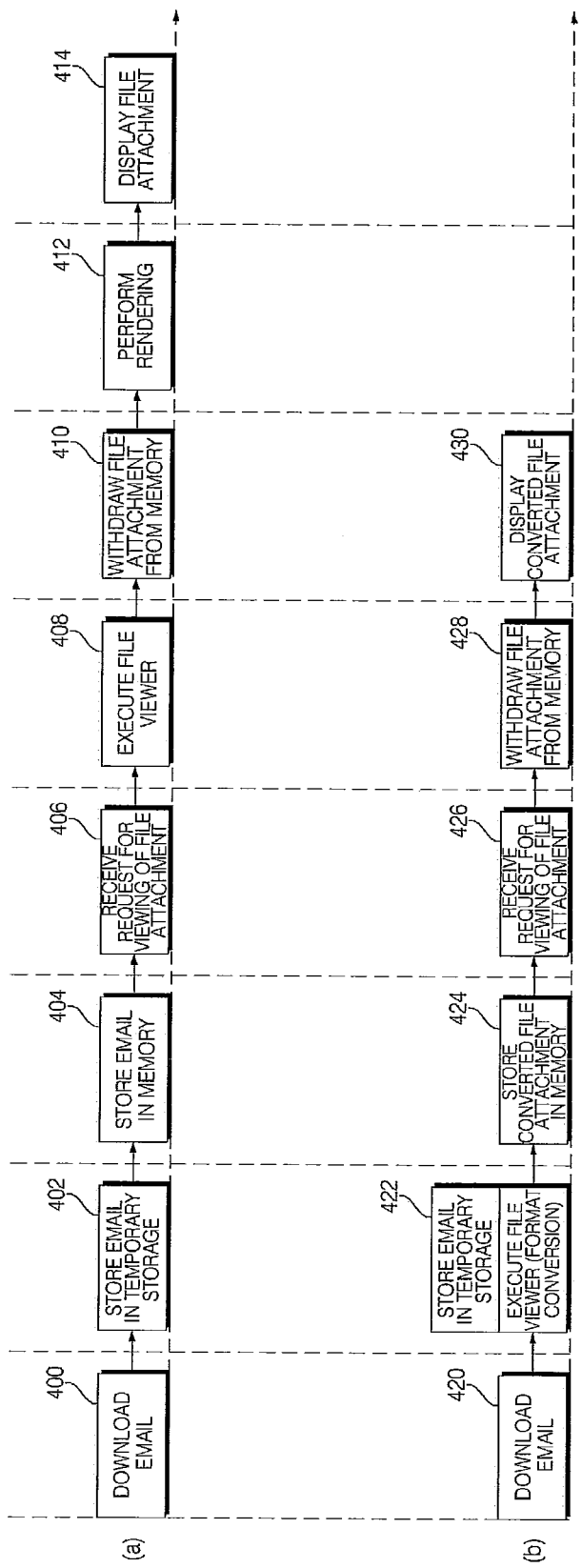
FIGS. 6(a) and 6(b) are diagrams comparing the processing of an email as performed in the method of FIG. 5 with the processing of an email by a typical mobile terminal.

FIGS. 6(a) and 6(b) are diagrams comparing the processing of an email as performed in the method of FIG. 5 with the processing of an email by a typical mobile terminal. More specifically, FIG. 6(a) illustrates how a typical mobile terminal processes an email. Referring to FIG. 6(a), an email is downloaded from the mail server 200 (400). The downloaded email is stored in a temporary storage in a processor (402). Thereafter, the downloaded email is also stored in an external memory such as an SD memory (404).

Thereafter, if a request for a viewing of a file attachment, if any, of the downloaded email is issued in accordance with, for example, a user command (406), a file viewer is executed (408). Then, the file attachment in the downloaded email is withdrawn from the external memory (410). Thereafter, the withdrawn file attachment is subjected to, for example, rendering, so that it can fit the size of a display area on a display module (412). Thereafter, the resulting file attachment is displayed on the display module (414).

FIG. 6(b) illustrates how the mobile terminal 100 processes an email. Referring to FIG. 6(b), when an email is downloaded from the mail server 200 (420), the controller 180 stores a file attachment, if any, of the downloaded email in the temporary storage thereof, executes a file viewer and converts the file attachment almost at the same time (422). Thereafter, the downloaded email and the converted file attachment are stored in an external memory such as an SD memory (424). Thereafter, if a request for a viewing of the file attachment in the downloaded email is issued in accordance with, for example, a user command (426), the converted file attachment is withdrawn from the external memory (428). Thereafter, the withdrawn file attachment is displayed on the display module 151 (430).

In short, according to the exemplary embodiment of FIGS. 5, 6(a) and 6(b), it is possible to simplify a whole email processing operation, compared to an email processing operation performed by a typical mobile terminal, and thus to reduce power consumption. In addition, according to the exemplary embodiment of FIGS. 5, 6(a) and 6(b), file conversion is performed on a file attachment in an email only once, whereas, conventionally, rendering needs to be performed whenever a viewing of a file attachment in an email is requested. Moreover, according to this exemplary embodiment, since file attachments of emails are stored in an SD memory in smaller sizes than they actually are, it is possible to make efficient use of the storage capacity of the SD memory.

In the meantime, when an email having a multimedia data file attachment such as a JPEG or TIFF file is downloaded from the mail server 200, the controller 180 may decode the multimedia data file attachment with the aid of the multimedia player module 181 and may thus convert the multimedia data file attachment into a bitmap image file, thereby increasing the power consumption of the mobile terminal 100. In addition, since the bitmap image file needs to be converted into a file that fits the size of the display area on the display module 151, the whole email processing operation may become complicated.

In order to address these problems, a method is needed to convert a multimedia data file attachment in an email and thus to allow the multimedia data file attachment to be readily displayed on the display module 151 without a requirement of decoding, and this will hereinafter be described in further detail.

FIG. 7 is a flowchart illustrating a method of converting the format of a file attachment in an email according to an exemplary embodiment of the present invention, which is performed by the mail server 200. Referring to FIG. 7, the mail server 200 receives an email from another mail server (S500), and determines whether a multimedia data file such as a JPEG or TIFF file is attached to the received email (S505).

Thereafter, if it is determined in operation S505 that the received email has a multimedia data file as a file attachment, the mail server 200 converts the multimedia data file to a predetermined format such that the multimedia data file can be readily displayed without a requirement of decoding. Examples of the predetermined format include, but are not limited to a BMP format.

Thereafter, the mail server 200 creates an email having the converted multimedia data file as a file attachment (S515) and downloads the created email into the mobile terminal 100 (S520). The created email may be compressed, if necessary, using a typical data compression method that does not require the use of the multimedia player module 181.

In this manner, it is possible to readily display a multimedia data file included in an email on the display module 151 without a requirement of decoding. Alternatively, the method of FIG. 7 may be performed in the mobile terminal 100, not in the mail server 200. In this case, the mobile terminal 100 may perform the conversion of a multimedia file attachment in an email into a file that can be readily displayed without a requirement of decoding before the conversion of the multimedia file attachment into a file that fits the size of the display area on the display module 151.

The present invention can be realized as code that can be read by a processor included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, a file attachment, if any, of an email is converted into a file that fits the size of the screen of a mobile terminal as soon as the email is downloaded, and the converted file attachment is then stored in a memory of the mobile terminal. Thus, it is possible to readily display the whole email on the screen of the mobile terminal without a requirement of rendering. Therefore, it is possible to reduce the power consumption of the mobile terminal on email processing.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling the operation of a mobile terminal, the method comprising: downloading, via a wireless communication unit, an email into a temporary storage from a mail server, wherein the email includes a header, content, and a first file; converting, via a controller, the first file corresponding to a file attachment in the email into a second file to fit a size of a display area of the mobile terminal; storing the email and the second file in a memory; withdrawing, from the memory, the content of the email and displaying, on the display area, the content, if a first request to display the content is received; and withdrawing, from the memory, the second file and displaying the second file on the display area without a requirement of rendering the first file, if a second request to display the first file is received, wherein the converting of the first file comprises automatically executing a file viewer and creating the second file through the executing file viewer upon the commencement of the downloading of the email, and wherein the download of the email, the execution of the file viewer and the conversion of the file attachment in the email are performed at the same time in a time-sharing manner by the controller of the mobile terminal.

2. The method of claim 1, wherein the converting of the first file comprises:
converting the first file into the second file upon the commencement of the downloading the email.

3. The method of claim 1, wherein the memory includes a secure digital (SD) memory.

4. The method of claim 1, wherein the first file is an uncompressed bitmap image file provided by the mail server.

5. The method of claim 1, wherein the first file is obtained by file conversion performed by the mail server and is readily displayed on the display area without further decoding the first file upon receiving the second request.

6. The method of claim 1, wherein the converting step reduces a size of the first file into a size of the second file, and the size of the second file is smaller than the size of the first file.

7. The method of claim 1, when the file attachment comprises a multimedia data file, the method further comprising:
converting the file attachment having a first format into a file having a predetermined second format to be readily displayed on the display area of the mobile terminal without further decoding the file attachment before converting the first file into the second file.

8. A mobile terminal comprising: a wireless communication unit configured to download an email from a mail server, wherein the email includes a header, content and a file attachment; a display module configured to display the content and the file attachment in the email; a memory; and a controller configured: to convert the file attachment into a file that fits a size of a display area on the display module, to store the email and the converted file in the memory, to withdraw the content from the memory and display the content on the display module, if a first request to display the content is received, to withdraw the file from the memory and display the converted file on the display module without a requirement of rendering the file attachment, if a second request to view the file attachment is received, to automatically execute a file viewer and create the second file through the executing file viewer upon the commencement of the downloading of the email, and to perform the download of the email, the execution of the file viewer and the conversion of the file attachment in the email at the same time in a time-sharing manner by the controller of the mobile terminal.

9. The mobile terminal of claim 8, wherein the memory includes an SD memory.

10. The mobile terminal of claim 8, wherein he controller is further configured to convert the file attachment upon the commencement of the download of the email.

11. The mobile terminal of claim 8, wherein the controller is further configured to include a temporary storage therein to store the file attachment.

12. The mobile terminal of claim 8, wherein the file attachment includes an uncompressed bitmap image file provided by the mail server.

13. The mobile terminal of claim 8, wherein the file attachment includes a file obtained by file conversion performed by the mail server and is readily displayed on the display module without further decoding the file attachment upon receiving the second request.

14. The mobile terminal of claim 8, wherein the controller is further configured to reduce a size of the first file into a size of the second file, and the size of the second file is smaller than the size of the first file.

15. The mobile terminal of claim 8, wherein when the file attachment comprises a multimedia data file, the controller is further configured to convert the file attachment having a first format into another file having a predetermined second format to be readily displayed on the display module of the mobile terminal without further decoding the file attachment before converting the file attachment into the file.

* * * * *